United States Patent [19]
Camp, Jr. et al.

[11] Patent Number: 5,521,985
[45] Date of Patent: May 28, 1996

[54] APPARATUS FOR RECOGNIZING MACHINE GENERATED OR HANDPRINTED TEXT

[75] Inventors: William O. Camp, Jr., Ithaca; Keith J. Werkman, Owego, both of N.Y.

[73] Assignee: International Business Machines Corporation, Armonk, N.Y.

[21] Appl. No.: 345,281

[22] Filed: Nov. 28, 1994

Related U.S. Application Data

[63] Continuation of Ser. No. 929,243, Aug. 13, 1992, abandoned.

[51] Int. Cl.$^6$ .............................. G06K 9/34; G06K 9/76; G06K 9/46; G06K 9/00
[52] U.S. Cl. ................ 382/176; 382/170; 382/161; 382/210; 382/187
[58] Field of Search .................... 382/3, 7, 13, 18, 382/41, 51, 30, 186, 192, 170, 224, 187, 119, 171, 156, 279, 176, 210

[56] References Cited

U.S. PATENT DOCUMENTS

| | | | |
|---|---|---|---|
| 4,516,262 | 5/1985 | Sakurai | 382/18 |
| 5,033,097 | 7/1991 | Nakamura | 382/18 |
| 5,181,255 | 1/1993 | Bloomberg | 382/9 |
| 5,212,741 | 5/1993 | Barski et al. | 382/51 |
| 5,228,095 | 7/1993 | Abe | 382/18 |

*Primary Examiner*—Jose L. Couso
*Assistant Examiner*—Matthew C. Bella
*Attorney, Agent, or Firm*—Richard M. Goldman

[57] ABSTRACT

A computer system with an image reader and nerual network is provided for determining whether an image of text has been generated by a machine or by hand. This serves the useful purpose of allowing one to use speciallized recognition techiques that are more suited to one form of printing, thus achieving a higher recognition accuracy than by using a single recognition technique for both types of printing. The method is based on the premise that the spatial spectra for an image of machine text will have more higher frequency components than one generated by hand, because of the nonregular, nonuniform slant of the handprint. The method proposed generates this spectra by convolving spatial templates with vertical histograms from each line of text, and uses a neural network to classify the resulting spectra.

3 Claims, 2 Drawing Sheets

Karen Arms
2024 Walthou
Savannah, GA 201       202       203       204 mIT Press Jour
55 Hayward :
Cambridge,r 211       212       213       214

MIT Press Jour
55 Hayward :
Cambridge M 221       222       223       224

APPARATUS FOR RECOGNIZING MACHINE GENERATED OR HANDPRINTED TEXT

The application is a continuation, of application Ser. No. 07/929,243, filed Aug. 13, 1992, now abandoned.

FIELD OF THE INVENTION

These invention relates to optical character recognition and particularly to the need to determine whether the text to be recognized is either generated by machine or by hand, as different methods of character recognition can be applied with enhanced performance over a single recognition method applied to both types of text.

GLOSSARY OF TERMS

OCR—Optical Character Recognition; the task of determining the particular character being portrayed on a medium by an image.

Neural Network—A set of connections between nodes that modify the value of the signal passed from one node to the next. Often many connections impinge on a node, and the summation of values at the node is further modified by a nonlinear function such as a threshold and amplitude limiter. Values at the input nodes represent the signals to be evaluated by the network, and values at the outputs represent an evaluation by the network of the input signals. For instance, the input could be image pixels and the outputs could represent possible patterns to which the image could be assigned. The connections weights are often determined and modified by training data, but they can also be prespecified in total or in pad based on other information about the task of the network.

Machine print—Text image on a medium that has been generated by a mechanical device such as a printer.

Hand print—Text image on a medium that has been generated by a human hand without the aid of any device (such as a ruler or a template) that would make the resulting image have very regular size, shape and slant. The term includes hand generated cursive script.

Spectra—A signal or histogram versus frequency or a variable that represents frequency-like behavior.

Template—A pattern to be applied to an image in the manner of a convolution.

Convolution—The repetitive application across the total domain of a signal or image of the procedure whereby a portion of the signal or image (often represented as a vector) is multiplied, component by component (of the vector), with a template pattern signal or image, and the sum of these multiplications is accumulated for each possible positioning of the template on the signal or image.

REFERENCES USED IN THE DISCUSSION OF THE INVENTION

During the detailed description which follows the following works will be referenced as an aid for the reader. These additional references are:
1. U.S. Pat. No. 5,025,475, Yoshle Okabe, Processing Machine, Jun. 18, 1991.
2. U.S. Pat. No. 4,910,787, Tetsuo Umeda, et.al., Discriminator Between Handwritten and Machine-Printed Characters, Mar. 20, 1990.
3. U.S. Pat. No. 4,516,262, Akira Sakurai, Character Data Processing Apparatus, May 7, 1985.
4. U.S. Pat. No. 4,379,283, Koji Ito, et.al., Type Font Optical Character Recognition System, Apr. 5, 1983.
5. U.S. Pat. No. 4,958,375, Douglas L. Reilly, et.al., Parallel, Multi-unit, Adaptive Pattern Classification System Using Inter-unit Correlations and an Intra-unit Class Separator Methodology, Sep. 18, 1990.
6. U.S. Pat. No. 4,977,603, Bunpei Irie, et.al., Method and Apparatus for a Pattern Recognition, Dec. 11, 1990.
7. U.S. Pat. No. 5,034,991, Kinuyo Hagimae, et.al., Character Recognition Method and System, Jul. 23, 1991.

These additional references are incorporated by reference. They are referred to by number below.

BACKGROUND OF THE INVENTION

As background for my invention it is noted that several methods have been implemented for the purpose of interpreting an image on a medium for its correspondence with the characters of an alphabet (1–7). These generally come under the category of character recognition or optical character recognition (OCR). Some of these methods do the recognition regardless of how the characters were generated on the medium (6–7). Another subset of these methods are general classification schemes with respect to a general set of features (5). Another subset of these methods further distinguish characteristics an image of text (1–4). Two of the referenced methods have the sole objective (2) or partial objective (1) to discriminate whether the image has been either machine printed or handprinted. The advantage of making this discrimination is that one can use different OCR methods for two different types of text, with a corresponding increase in accuracy and/or speed of recognition.

This prior art uses methods and implementation that are different than we espouse, and therefore, does not have the performance of discrimination. My method uses a spectral analysis of features of the image and uses a feedforward neural network to discriminate between the spectrum of the two types of printing.

SUMMARY OF THE INVENTION

The improvements which we have made achieve an increased accuracy and speed in the discrimination of machine printed text from handprinted text.

These improvements are accomplished by providing:
A mechanism that creates a spectrum whose characteristic is dependent on the type of printing;
A feedforward neural network to analyze this spectrum and classify it into one of the two types: that representative of machine print text and that representative of handprinted text.

The general effect of my invention will be to create a spectra based on the vertical characteristics of the text and then to analyze that spectra, looking for the relative relationship of high frequency to low frequency components. The reasoning for this method is that machine printed text will have uniform, vertical width lines whose vertical projections will create histograms of pixel counts versus horizontal position that are high for very narrow horizontal dimensions. The histograms for handprinted text will be broader and lower, because of the variations in line direction. Convolving templates that represent spatial filters of varying spatial frequencies across these histograms and summing the responses versus horizontal position for each template, will create a spectra representative of horizontal spatial frequency. This spectra, it turns out, has a distinct pattern of relative amplitude between the high and low frequency components for the two styles of printing: higher frequencies have higher relative amplitude for the machine print and lower frequencies have higher relative amplitude for the handprint. This analysis is accomplished in many ways, a neural network shown here as a particularly good and efficient way to do this.

In its simplest embodiment, the invention consists of a device to transform the image into a pixel format, preferably in the memory of a processor or computer where the array values are either binary of grey scale representations of the image darkness (or, equivalently, brightness); a processor to divide the image into single horizontal lines of text, using horizontal histograms of pixel counts; a processor to generate the vertical histograms versus horizontal position for each line of text; a processor to convolve the spatial templates with these histograms and accumulate the sums representing the spectra (of approximately 6 spatial frequencies); and a neural network for analyzing the spectra and classifying it into one of the two categories.

This invention is distinguished from the prior art, in that (7) accumulates these vertical histograms, but does not use them for this purpose; (2) determines verticalness with 3 by 3 spatial kernels that do not have the spatial selectivity of the combined method of vertical histograms and convolution with spatial templates; (1) generates histograms of 8 features and measures the dispersions of these histograms, which again does not create the spatially selective filter that our method does, in addition to calculating many more parameters than our method does.

These and other improvements are set forth in the following detailed description. For a better understanding of the invention with advantages and features, reference may be had to the description and to the drawings.

My detailed description explains the preferred embodiments of my invention, together with advantages and features, by way of example with reference to the following drawings.

DETAILED DESCRIPTION OF THE INVENTION

The Preferred Embodiment

Figure 1:
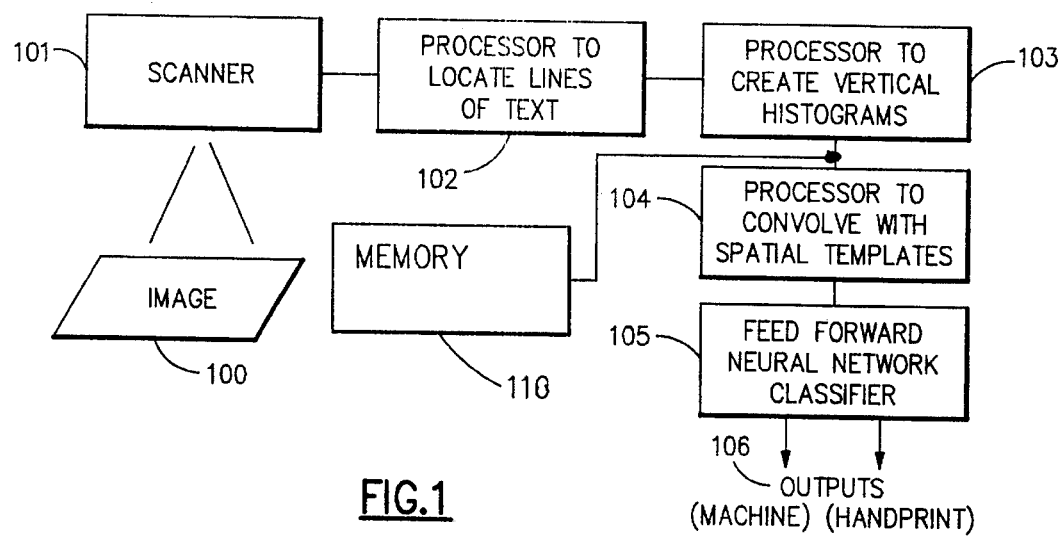
FIG. 1 shows schematically an overview of the preferred embodiment and particularly shows the processor elements needed to achieve our method.

Turning now to my invention in greater detail, it will be seen from FIG. 1 that illustrates my preferred embodiment in which, a scanner 101, is used to transform the image 100 into a pixel format, preferably in the memory 110 of a processor or computer where the array values are either binary of grey scale representations of the image darkness (or, equivalently, brightness); a processor 102 is then used to divide the image into single horizontal lines of text, using horizontal histograms of pixel counts; a processor 103 then generates the vertical histograms versus horizontal position for each line of text; a processor 104 convolves the spatial templates with these histograms and accumulate the sums representing the spectra (of approximately 6 spatial frequencies); and a neural network 105 for analyzing the spectra and classifying it into one of the two categories as outputs 106.

Figure 2:
FIG. 2 shows the inputs and intermediate and final results for three example images. The horizontal histograms are used to determine the vertical extent of each line. The vertical histograms are then convolved with the spatial templates and the sums of these convolutions are shown as a spectra. The input images are part of the figure.
Figure 2:
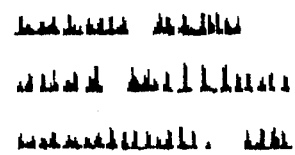
Figure 2:
Figure 2:
Figure 2:
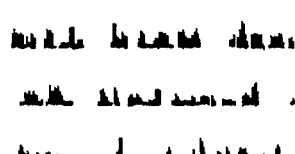
Figure 2:
Figure 2:
Figure 2:
Figure 2:

FIG. 2 shows the outputs from each processor for three examples of scanned image. The input images are 201, machine printed, 211, handprinted, and 221, hand generated cursive script. The outputs of the horizontal line processor are 202, 212, and 222 for the three example of printing. One such technique for determining the vertical extent of each line is to count up the black or grey picture elements of the image on successive horizontal scan lines and pick up as a horizontal line of text a series of scan lines which contain at least a predetermined number of black picture elements. A horizontal histograms are shown for several blocks of text in FIG. 2, see elements 202, 212 and 222. The outputs of the vertical histogram processor are 203, 213, and 223, respectively. And the spectra for the three cases are 204, 214, and 224, respectively.

Figure 3:
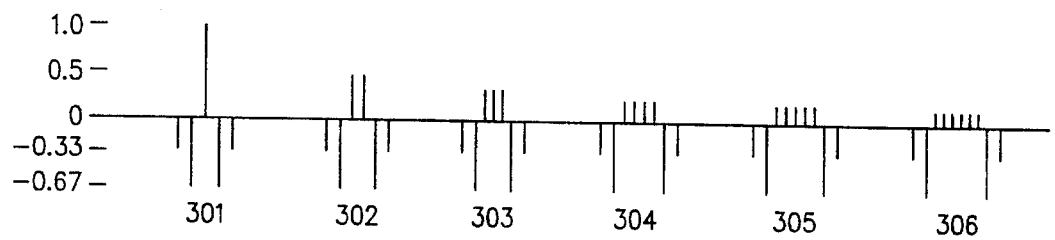
FIG. 3 shows the spatial templates for the 6 frequencies used in the example. They range from high frequency on the left to lowest frequency on the right.

The preferred templates 301 through 306 are shown in FIG. 3. They are effectively spatial filters that act on the vertical histograms to create the spectra. Template 301 when convolved with a vertical histogram generates a large signal where the vertical histogram contains many narrow vertical lines adjacent to spaces of few pixels, as would be generated by a machine. Template 306 when convolved with a vertical histogram generates a large signal where the vertical histogram contains wide lines with little space in between. The templates have large negative values at the edges that make them more responsive to the white spaces in the image. This contributes to the discrimination between the methods of printing, as the white space in the vertical histograms of handprinting are much more rare than in machine printing.

Figure 4:
FIG. 4 shows the weights of the neural network and the results of using that network for an example input spectrum.

FIG. 4 shows the schematic of the neural network where input signals, the spectra 401, are multiplied by weights 402, accumulated at nodes 403, to be multiplied by weights 404, and accumulated at the final output nodes 405. The values of the weights are depicted by the size of the line, one for each spectrum input plus a bias weight. The overall effect is to compare the spectra components such that spectra with large low frequencies and small high frequencies are classified as handprinted and spectra with small low frequencies and large high frequencies are classified as machine printed.

While I have described my preferred embodiments of my invention, it will be understood that those skilled in the ad, both now and in the future, may make various improvements and enhancements which fall within the scope of the claims which follow. These claims should be construed to maintain the proper protection for the invention first disclosed.

What is claimed is:

1. An apparatus for recognizing whether text in an image is machine print or hand print, the apparatus comprising:

a feed forward neural network processor for processing digital information;

a memory for storing digital information processed by said feed forward neural network processor, an image reader for reading an image containing text into the memory in pixel format;

a means for separating the image into horizontal lines of text, using a horizontal histogram of pixel counts;

a means for processing each said horizontal line of text into a vertical histogram;

a convolving means for convolving across the vertical histograms with each of a plurality of templates, each template representing a spatial filter, accumulating the responses for each template from each horizontal position of the vertical histograms as each template is convolved across the vertical histograms, the accumulated responses from each of the templates collectively forming a spectra having high frequency components and low frequency components and whose characteristic is dependent on whether it is machine printed or hand printed; and the feed forward neural network processor looking for the relative relationship of high frequency to low frequency components for classifying the spectra as machine print or hand print, said neural network having the spectra as input and weight means for multiplying the spectra input at nodes and accumulating a final output thereof at final output nodes, with a first output providing an indication that the text contained in the image is machine print, with high frequencies having high relative amplitude, and a second output providing an indication that the text contained in the image is hand print with low frequencies having high relative amplitudes.

2. An apparatus according to claim 1 wherein the spectra formed has high frequency components and low frequency components wherein for machine print the high frequency components have a higher relative amplitude than the low frequency components and for hand print the low frequency components have a higher relative amplitude than the high frequency components.

3. An apparatus according to claim 2 wherein the neural network process uses the relative amplitudes of the high frequency components and the low frequency components to classify the spectra.

* * * * *